United States Patent
Ravichandran

(10) Patent No.: US 10,462,291 B1
(45) Date of Patent: Oct. 29, 2019

(54) SHARED GROUP NUMBER

(71) Applicant: T-Mobile USA, Inc., Bellevue, WA (US)

(72) Inventor: Vinod Ravichandran, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/209,776

(22) Filed: Dec. 4, 2018

(51) Int. Cl.
*H04M 3/42* (2006.01)
*H04M 3/46* (2006.01)
*H04W 8/18* (2009.01)

(52) U.S. Cl.
CPC ....... *H04M 3/42263* (2013.01); *H04M 3/465* (2013.01); *H04W 8/186* (2013.01)

(58) Field of Classification Search
CPC .... H04M 3/465; H04M 3/42212; H04M 3/44; H04M 3/46; H04W 8/186
See application file for complete search history.

(56) References Cited

U.S. PATENT DOCUMENTS

| | | | | |
|---|---|---|---|---|
| 2006/0009249 A1* | 1/2006 | Fu | .......................... | H04W 4/08 455/518 |
| 2006/0252444 A1* | 11/2006 | Ozugur | .................. | H04M 3/46 455/519 |
| 2008/0144798 A1* | 6/2008 | Sidhom | .................. | H04M 3/436 379/211.02 |
| 2009/0109958 A1* | 4/2009 | La Pierre | ............ | H04L 65/1046 370/352 |
| 2011/0159889 A1* | 6/2011 | Kojo | ...................... | H04M 3/229 455/456.1 |
| 2011/0246656 A1* | 10/2011 | Horowitz | .............. | H04M 3/465 709/228 |
| 2011/0317684 A1* | 12/2011 | Lazzaro | ................. | G06Q 30/04 370/352 |
| 2014/0051485 A1* | 2/2014 | Wang | ..................... | H04W 4/70 455/574 |
| 2016/0088450 A1* | 3/2016 | Bendi | ..................... | H04W 4/14 455/404.1 |
| 2018/0054720 A1* | 2/2018 | Messenger | ............ | H04W 76/10 |

* cited by examiner

*Primary Examiner* — Christopher M Brandt
(74) *Attorney, Agent, or Firm* — Lee & Hayes, P.C.

(57) ABSTRACT

A group database can maintain information about member user equipments (UEs) that are part of a group associated with a shared group number. One or more of the member UEs can be associated with distinct phone numbers that are different from the shared group number. One or more communication servers can route incoming calls and text messages sent to the shared group number to one or more member UEs based on the information in the group database, such as routing incoming calls only to member UEs indicated as being active members of the group in the group database.

17 Claims, 8 Drawing Sheets

SHARED GROUP NUMBER

BACKGROUND

User equipment (UE) can be wireless telecommunication devices associated with phone numbers. For example, a first individual can have a first UE associated with a first phone number, while a second individual can have a second UE associated with a second phone number.

Multiple individuals can be part of a group associated with a particular entity. For example, multiple employees can be in a group associated with a small business. As another example, multiple family members can be in a group associated with a family. Accordingly, a group associated with the same entity can include multiple individuals that each have their own distinct UEs that may be associated with distinct phone numbers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
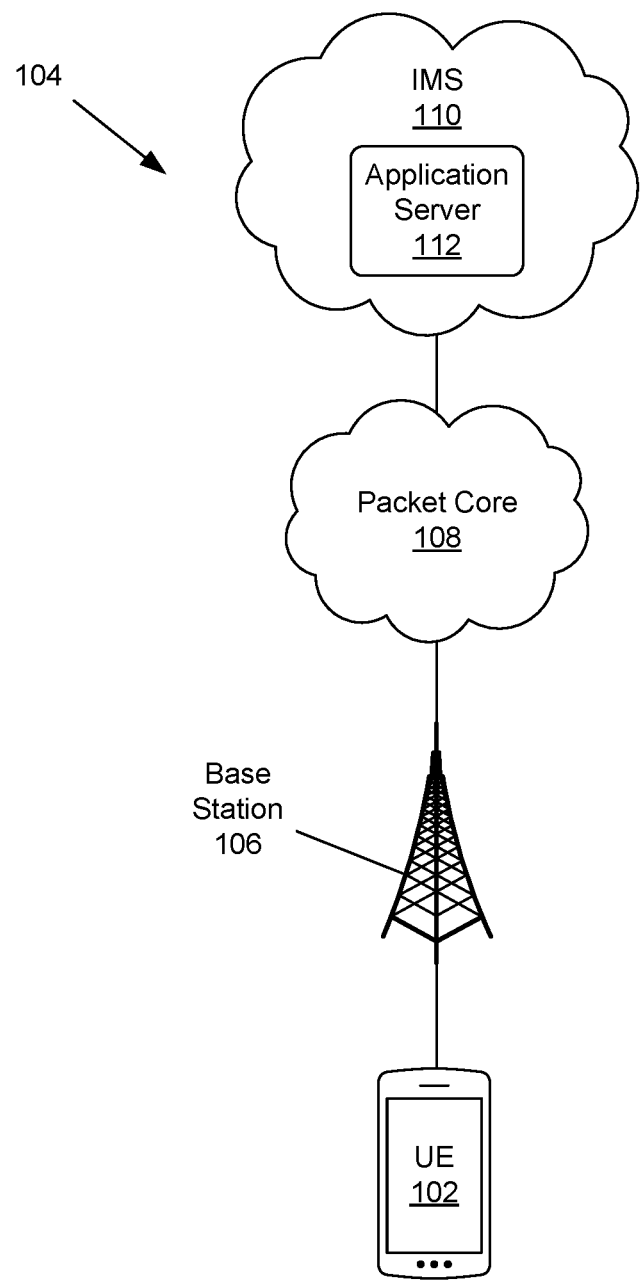
FIG. 1 depicts an example network environment in which user equipment (UE) can connect to a telecommunication network.

Individuals associated with a particular entity may each own or be associated with different user equipment (UE). For example, employees of a business may each be assigned mobile phones for business use. As another example, members of a family may each have their own UE. Although each UE may be associated with the same entity, each UE can also be associated with a different individual and may be associated with its own distinct phone number.

Because each UE in a group may have its own phone number, it can be time consuming and/or frustrating for callers to connect with any member of the group, as various individuals in the group may be unavailable at the time the caller makes a call. For example, when a caller wants to have their call answered by any member of the group, but does not care which one, the caller may need to try calling each member of the group individually until one of them answers. In other cases, the group may have a main phone number that connects to a single answering point. At that single answering point, a human or an automated interactive voice response (IVR) can answer calls to obtain information about who the caller wants to contact, and then forward the call on to another single answering point associated with the desired recipient of the call. However, if that recipient does not answer, the call may need to be returned to the initial single answering point to be routed to another recipient, or the caller may leave a voicemail and wait for the recipient to return the call.

These conventional ways of attempting to call members of a group can be frustrating for callers who want to contact any individual associated with a group as quickly as possible, but who do not necessarily care which individual answers the call. For example, when a caller wants to call a business to order a product or server, the caller may not care which salesperson answers the call. Nevertheless, in conventional systems the caller might be routed to a particular salesperson's phone, have to leave a voicemail, and then have to wait for that salesperson to return the call.

While the conventional systems described above generally route calls to a single answering point, other telephone systems may allow calls to ring at multiple phones, such that there is a better chance of the call being answered by an available recipient. For example, traditional landline phone numbers may be connected to multiple phones at a location, such as a landline connected to multiple phones in a family's house. When the phone number for that landline is called, all the phones in the house may ring and any family member may answer the call at any of the phones. However, because all of the phones are directly associated with the same phone number, such traditional landlines generally do not provide options for routing calls to different sets of phones associated with different phone numbers based on which members of a group are designated as active or inactive. Such traditional landlines are also limited to being located in a particular location, and do not offer the mobility benefits provided by wireless communication devices connected to wireless telecommunication networks. For example, a caller may want to make a call to any member of a team of repair personnel that have been deployed at different locations in the field.

Hunt groups have been developed in which multiple devices can be associated with the same user account, and calls to a particular number associated with that account can be sent to one or more of the devices associated with that user. However, conventional hunt groups are associated with the same user account and the same phone number, not with a group of users or devices that may have distinct phone numbers.

Described herein are systems and methods that can allow a group of wireless user equipment (UE) devices that each have their own phone numbers to also be associated with a shared group number. The group can be managed by an administrator and/or individual users of each UE to indicate which UEs are active and inactive members of the group. Calls sent to the shared group number can then be forwarded on to active members of the group. If more than one member is active, then the call can ring simultaneously at multiple active member UEs and any of them can answer the call. Relative to conventional systems in which a call is routed to a single answering point without respect to whether an associated user is active or inactive, such that callers may often have to leave a voicemail at that single answering point and wait for a return call, routing the call to a shared group number to one or more UEs that are designated as active members of the group can lead to a greater chance of the call being answered. Similarly, text messages and other messages sent to the shared group number can be delivered to multiple member UEs instead of a single recipient, again leading to a greater chance of the sender receiving a response from a member of the group.

Example Environments

FIG. 1 depicts an example network environment in which user equipment (UE) 102 can connect to a telecommunication network 104 to engage in communication sessions for voice calls, video calls, data transfers, or any other type of communication.

A UE 102 can be any device that can wirelessly connect to the telecommunication network 104. For example, a UE 102 can be a smart phone, a cellular phone, a personal digital assistant (PDA), a personal computer (PC), a laptop, a desktop, a workstation, a media player, a tablet, a gaming device, a smart watch, or any other type of computing or communication device.

A UE 102 can be associated with one or more identifiers of the UE 102 and/or a user of the UE 102. In some examples, a UE 102 can be associated with a Mobile Station International Subscriber Directory Number (MSISDN), a phone number that is assigned to the UE 102 and/or is associated with a particular user account. For example, the UE 102 can have a Subscriber Identity Module (SIM) that contains the MSISDN. As another example, a user may log in to a communication application, such as a calling and/or messaging application, that allows communications for an MSISDN associated with the user to be sent and/or received via the UE 102. A UE 102 may also be identified by, or associated with, other identifiers such as an International Mobile Equipment Identifier (IMEI) or an International Mobile Subscriber Identity (IMSI).

The telecommunication network 104 can have one or more base stations 106, a packet core 108, and an IP Multimedia Subsystem (IMS) 110. Elements of the telecommunication network 104 can be based on one or more wireless access technologies and/or provide network access to UEs 102 through one or more wireless access technologies. For example, wireless access technologies can include fifth generation (5G) technology, Long Term Evolution (LTE)/LTE Advanced technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, and WiFi® technology.

A base station 106 can be a node or other access point that provides a connected UE 102 with access to the packet core 108 through a wireless access technology. For example, a base station 106 can be a Node B (NB), eNode B (eNB), gNB, Wi-Fi access point, or any other type of base station or access point.

The packet core 108 can include elements that can receive, process, and/or forward data packets from other network elements. For example, the packet core 108 can include gateways that link the packet core 108 to base stations 106, to the IMS 110, and/or to other networks, such as the Internet.

The IMS 110 can include elements that can set up resources for communication sessions, manage communication sessions, and/or provide services for communication sessions. Elements of the IMS 110 can use messages, such as Session Initiation Protocol (SIP) messages, to exchange information with each other and/or with UEs 102. For example, the IMS 110 can include Call Session Control Functions (CSCFs) that can process and/or route SIP messages, as well as application servers 112 that use such SIP messages to provide services to UEs 102. As will be discussed below, an IMS application server 112 can be a server that can manage calls and/or text messages for a group of UEs 102.

Figure 2A:
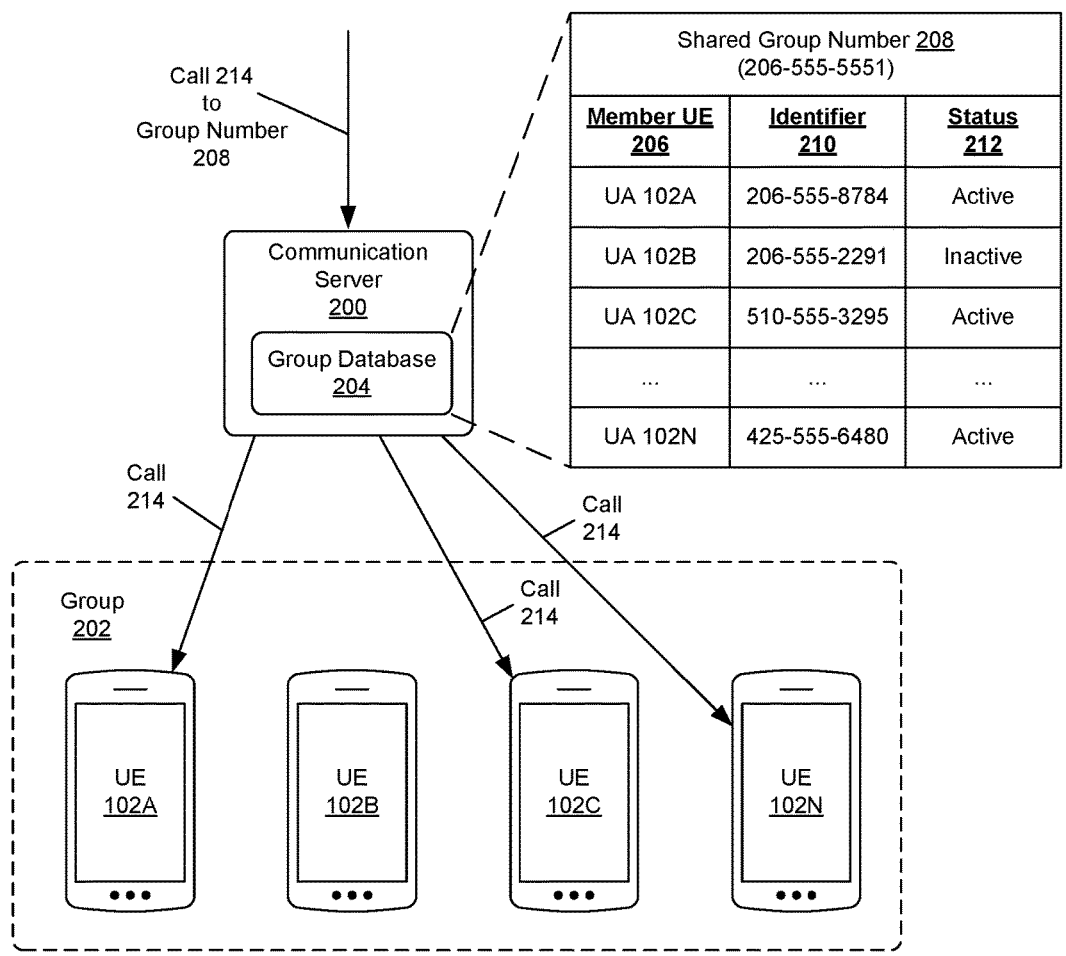
FIGS. 2A and 2B depict an example environment in which a communication server of a telecommunication network can manage and/or route communications, such as calls and text messages, for a group of UEs.
Figure 2B:
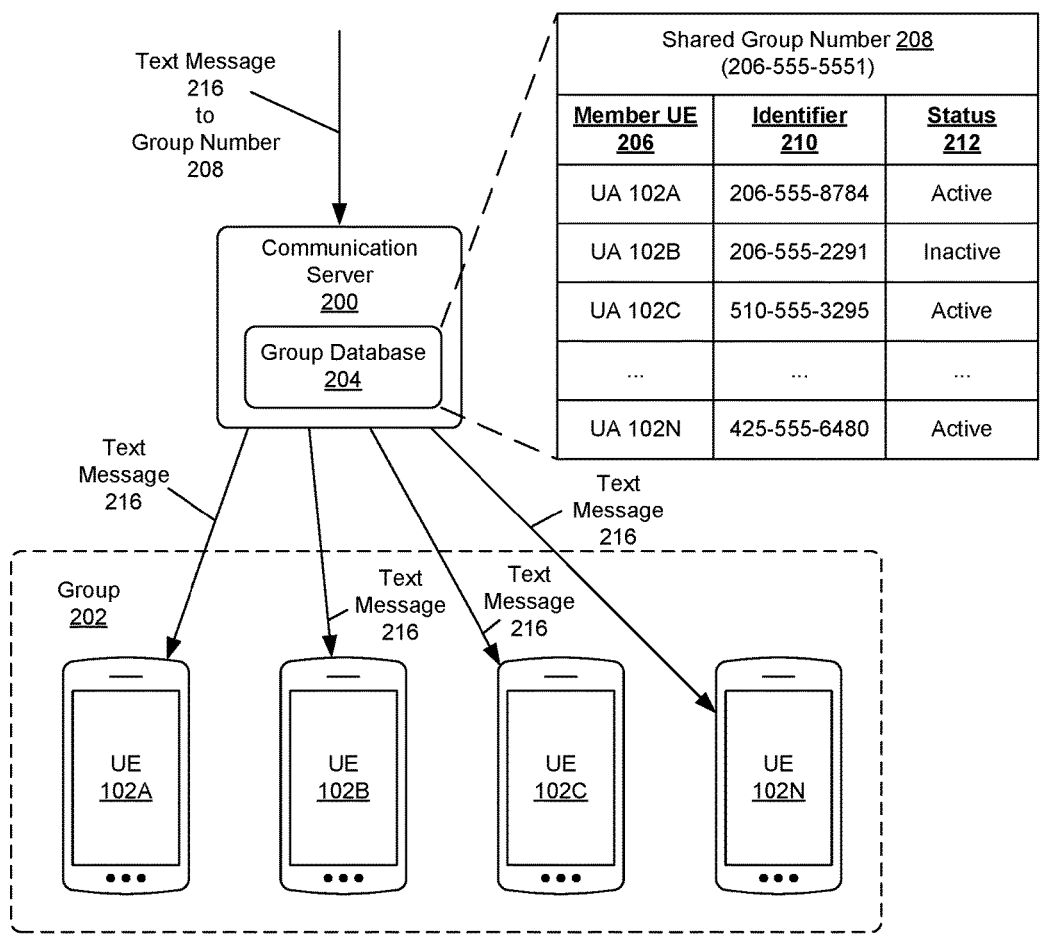

FIGS. 2A and 2B depict an example environment in which one or more communication servers 200 of a telecommunication network 104 can manage and/or route communications for a group 202 of UEs 102. The communication servers 200 can store and/or access a group database 204 that defines information about the group 202.

In some examples, a communication server 200 can be an application server 112 of an IMS 110, such that UEs 102 in the group 202 that are connected to the telecommunication network 104 can communicate with the communication server 200 through base stations 106, a packet core 108, and/or an IMS 110 as shown in FIG. 1. The communication server 200 can use messages, such as SIP messages, to manage and route communications for the group 202. For example, a communication server 200 can be a call application server of an IMS 110 that manages calls 214, a text messaging application server of an IMS 110 that manages text messages 214, or an application server of an IMS 110 that manages both calls 214 and text messages 216. In other examples, the communication server 200 can be any other type of server that routes and/or manages one or more types of communications for a group 202.

In some examples, the communication server 200 can be part of a particular domain in the IMS 110 that is associated with the group 202 or an associated entity. For example, when the group 202 is associated with a particular business, the communication server 200 can be in a business domain network associated with that business.

One or more UEs 102 can be designated as member UEs 206 of the group 202. The member UEs 206 of the group 202 can be UEs 102 that are associated with different individuals associated with an entity, such as a business, department, family, team, or any other collection of individuals. For example, a group 202 can include member UEs 206 associated with different employees of a small business. As another example, a group 202 can include member UEs 206 that belong to different members of a family. As a group 202 can include member UEs 206 that are associated with different individuals, at least some of the member UEs 206 can be associated with different unique identifiers, such as distinct MSISDNs associated with SIMs of different UEs 102.

A group 202 can be associated with a shared group number 208. The shared group number 208 can be a phone number, such as an MSISDN, associated with the group 202. The shared group number 208 can be a phone number that is directly associated with the group 202. As noted above, one or more member UE 206s can have distinct identifiers associated with those individual member UEs 206. Accordingly, the shared group number 208 can be a phone number that is different than the phone numbers of one or more of the member UEs 206.

The group database 204 can include information about the group 202, including the shared group number 208 and information about individual member UEs 206 of the group 202. The group database 204 can include one or more identifiers 210 for each member UE 206, such as a phone number (e.g. an MSISDN), an IMEI, and/or an IMSI associated with each member UE 206. The group database 204 can also include status information 212 about each member UE 206, such as flags or other values indicating whether member UEs 206 are currently active or inactive members of the group 202. As discussed further below with respect to FIG. 4, in some examples, the group database 204 can also include other types of information, such as names or titles associated with individual member UEs 206, indicators of whether member UEs 206 are associated with individuals designated as administrators of the group 202, priority levels associated with member UEs 206, and/or any other type of information.

Although in some examples a group database 204 can be stored at a communication server 200 that manages calls 214 and/or text messages 216, in other examples the group database 204 can be stored and managed at a separate server or data storage location that is accessible to one or more communication servers 200. For instance, when different communication servers 200 are configured to manage calls 214 and text messages 216, in some examples those different communication servers 200 can access the same group database 204 stored at a separate server.

A communication server 200 can be configured to receive communications, such as calls 214 and/or text messages 216, that are addressed to the shared group number 208. For example, when a caller places a call 214 to the shared group number 208, a SIP INVITE message can be routed through the telecommunication network 104 to a communication server 200. The SIP INVITE can be addressed to the shared group number 208. Similarly, when a user sends a text message 216 to the shared group number 208, the message 216 can be routed through the telecommunication network 104 to a communication server 200. A communication server 200 may also deliver other types of data sent to the shared group number 208 to member UEs 206, including faxes, shared files, and multimedia messages that include text, audio, and/or video, in a manner substantially similar to delivery of text messages 216 to member UEs 206.

In some examples, the member UEs 206 can send and receive calls 214 and/or text messages 216 in conjunction with the communication server 200 via native phone or operating system functionalities. In other examples, the member UEs 206 can run or access a communication application that interfaces with the communication server 200 to send and receive calls 214 and/or text messages 216. In some examples, such a communication application can exchange information directly with the communication server 200 using SIP messages or any other type of message. In other examples, the communication application can exchange information indirectly with the communication server 200. For example, the communication application can be a Real-Time Communications (RTC) client that can communicate with a WebRTC server using HTTP traffic, and the WebRTC server can translate SIP traffic from the communication server 200 to HTTP traffic understood by the communication application, and the WebRTC server can translate HTTP traffic from the communication application to SIP traffic understood by the communication server 200. Although the description herein describes interactions between member UEs 206 and a communication server 200, it should be understood that in some examples these interactions can occur between the communication server 200 and communication applications running on, or accessed by, the member UEs 206.

In some examples, the communication server 200 can include an automated interactive voice response (IVR) system or other system that can obtain information from a caller to identify a specific user that the caller wants to contact. Based on that information, the communication server 200 can accordingly send calls 214 and/or text messages 216 sent to the shared group number 208 to a member UE 206 associated with that that specifically identified user. However, in many cases a caller may simply wish to communicate with any user associated with of the group 202. Accordingly, as described below, the communication server 200 may use the group database 204 to forward calls 214 and/or text messages 216 sent to the shared group number 208 on to one or more member UEs 206 of the group 202.

FIG. 2A depicts a communication server 200 receiving a call 214 sent to the shared group number 208. When the communication server 200 receives a call 214 sent to the shared group number 208, the communication server 200 can use the group database 204 to identify which member UEs 206 of the group 202 are indicated as active in the status information 212 and forward the call 214 to at least some of those active member UEs 206. In some examples, the communication server 200 can then forward the call 214 to all active member UEs 206 simultaneously. In other examples, the communication server 200 can use priority information in the group database 204, as discussed below, to forward the call 214 to a first subset of the active member UEs 206 at a first time, and then to one or more additional subsets of the active member UEs 206 at one or more later times if the call 214 has not yet been answered.

When one or more member UEs 206 receive a forwarded call 214 from the communication server 200, those members UEs 206 can ring to alert users of the incoming call 214. When one of the member UEs 206 answers the call 214, it can notify the communication server 200 such that the communication server 200 instructs the other member UEs 206 to stop ringing for that call 214.

In some examples, the communication server 200 can send a call 214 addressed to a shared group number 208 to active member UEs 206 by sending SIP messages, such as SIP INVITE messages, to those active member UEs 206. For example, the communication server 200 can send a SIP INVITE message to an active member UE 206 based on an identifier 210, such as a phone number, in the group database 204 that is associated with the active member UE 206. The call 214 can accordingly ring at multiple member UEs 206 in response to these SIP messages when multiple member UEs 206 are designated as being active in the status information 212. The active member UEs 206 can also return responses to the communication server 200 indicating that they are ringing to alert users of the new call 214, such as returning SIP "180 Ringing" response messages.

If the call 214 is answered at one of the active member UEs 206, the answering member UE 206 can return an answer message to the communication server 200, such as a SIP "200 OK" response message, and a call session can be established between the answering member UE 206 and the caller. Upon receipt of the answer message from one active member UE 206, the communication server 200 can send ring cancelation messages to the other active member UEs 206, if any. For example, a ring cancelation message can be a SIP CANCEL message. Upon receipt of a ring cancelation message, a member UE 206 can stop ringing and deactivate user interface options to answer the call 214, since the call 214 has been answered at another member UE 206 of the group 202.

Although the communication server 200 can send a new incoming call 214 to one or more active member UEs 206 of a group 202 as discussed above, the communication server 200 can refrain from sending the new call 214 to member UEs 206 that are identified as inactive in the group database 204. For example, in FIG. 2A, the status information 212 indicates that UE 102A, UE 102C, and UE 102N are active member UEs 206, while UE 102B is designated as an inactive member UE 206. UE 102B may be indicated as inactive because a user of UE 102B is an employee of a business who does not want to receive calls 214 for the business because the employee is at lunch, is on vacation, is in a meeting, or otherwise does not want to receive calls 214 for the business on at least a temporary basis. Accordingly, when the communication server 200 receives a call 214 for the shared group number 208, the communication server 200 can forward the call 214 to the active member UEs 206 (including UE 102A, UE 102C, and UE 102N), but refrain from forwarding the call 214 to the inactive member UEs 206 (including UE 102B).

Although status information 212 can indicate that a member UE 206 is inactive, such that the communication server 200 can refrain from sending incoming calls 214 to that member UE 206 while it is inactive, the inactive member UE 206 can remain part of the group 202 so that it can later return to being active and receive subsequent new calls 214 to the shared group number 208 from the communication server 200. Although a member UE 206 can set its status information 212 to inactive to avoid receiving calls 214 to the shared group number 208, because the member UE 206 may have its own distinct phone number separate from the shared group number 208, the member UE 206 can continue to make and receive calls associated with its own distinct phone number even when the member UE 206 is identified in the group database 204 as being inactive.

FIG. 2B depicts a communication server 200 receiving a text message 216 sent to the shared group number 208. In some examples, the communication server 200 shown in FIG. 2B can be the same communication server 200 shown in FIG. 2A, however in other examples the communication server 200 shown in FIG. 2B can be a dedicated text messaging server while the communication server 200 shown in FIG. 2A can be a dedicated call server. When the communication server 200 of FIG. 2A receives a text message 216 sent to the shared group number 208, the communication server 200 can use the group database 204 to identify member UEs 206 of the group 202, and can forward the text message 216 to those member UEs 206. In some examples, the communication server 200 can forward the text message 216 to member UEs 206 of the group 202 without regard to the status information 212. For example, although UE 102B is identified as inactive in FIGS. 2A and 2B and a communication server 200 can use that status information 212 to refrain from sending calls 214 to UE 102B, a communication server 200 can be configured to send text messages 216 to UE 102B even while it is inactive. Accordingly, while new calls 214 may not ring at inactive member UEs 206 of a group 202, in some examples new text messages 216 may be delivered to such inactive member UEs 206. However, in other examples communication servers 200 can be set to avoid sending both calls 214 and text messages 216 to inactive member UEs 206.

In some examples, text messages 216 for the shared group number 208 that are forwarded to inactive member UEs 206 can received in the background of a communication application run on, or accessed by, the inactive member UEs 206. This can allow such text messages 216 for the shared group number 208 to be displayed in a non-obtrusive manner to users of an inactive member 206, even if other text messages 216 sent directly to that member's own distinct phone number are displayed according to different settings. For example, an inactive member UE 206 may receive a visual notification in a communication application of a new text message 216 for the shared group number 208, while a text message 216 sent to the member UE's own phone number can be presented in a different visual style and/or with an audible notification. In other examples, text messages 216 for the shared group number 208 and a member UE's own distinct phone number can be displayed in the same way at an inactive member 206.

In some examples in which member UEs 206 run or access a communication application that interfaces with one or more communication servers 200 as described above, a member UE 206 can also make outgoing calls 214 or send text messages 216 using the communication application. Although the member UE 206 can have its own distinct phone number, the communication application and/or communication server 200 may provide options through which a user can select the shared group number 208 as the originating number for an outgoing communication. The communication application, or a communication server 200, can thus alter data being sent to a recipient to identify the originating party using the shared group number 208. For example, a member UE 206 may initiate an outgoing call 214 via the communication application to a recipient in part with a SIP INVITE. In some examples, the communication application can prepare that SIP INVITE to identify the shared group number 208 as an originating number. In other examples, the SIP INVITE may identify the member UE's own phone number, but a communication server 200 can intercept that SIP INVITE and replace it with another SIP INVITE that identifies the calling party using the shared group number 208. Accordingly, although a user may be making a call 214 or sending a text message 216 from his or her own UE 102, the call 214 or text message 216 can appear to a recipient to have originated from the shared group number 208.

Figure 3:
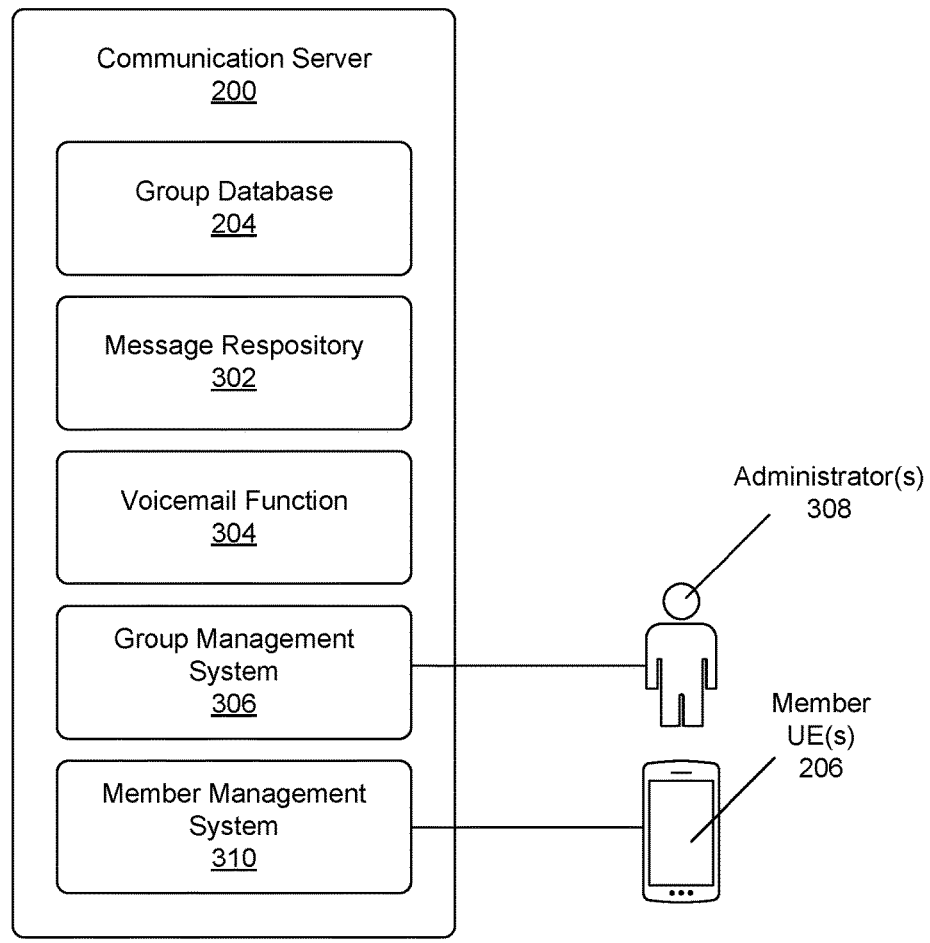
FIG. 3 depicts elements of a communication server.

FIG. 3 depicts additional elements of a communication server 200. In some examples, the communication server 200 can have the group database 204, a message repository 302, a voicemail function 304, a group management system 306, and/or a member management system 310. In some examples, one or more of the elements shown in FIG. 3 can be distributed among multiple communication servers 200 or other network elements. For example, as noted above the group database 204 can be stored or maintained at a centralized location that is accessible to other communication servers 200.

A communication server 200 can have a message repository 302 where copies of text messages 216 or other types of messages sent to the shared group number 208 can be stored. For example, although a new text message 216 can be delivered to member UEs 206 as shown above in FIG. 2B, a copy of the text message 216 can also be stored in the message repository 302. This can allow member UEs 206 or other entities to later retrieve or access stored text messages 216 from the message repository 302.

A communication server 200 can have a voicemail function 304 that can play a voicemail prompt for a caller and record a voicemail message from the caller. Such voicemail messages can be delivered to member UEs 206 and/or stored in the message repository 302 or other storage location, similar to delivery and storage of text messages 216. For example, when a call 214 for a shared group number 208 is received at a communication server 200 as shown in FIG. 2A, but no member UEs 206 are set as being active at the time or no active member UEs answer the call 214 within a predetermined period of time, the communication server 200 can use the voicemail function 304 to answer the call 214 and record a voicemail message from the caller. In some examples, the communication server 200 can be configured to then deliver the voicemail message to active member UEs 206, if any. In other examples, the communication server 200 can treat voicemail messages like text messages 216, such that the communication server 200 delivers the voicemail message to some or all member UEs 206 without regard to their status information, as shown in FIG. 2B.

A communication server 200 can have a group management system 306. One or more users can be designated as administrators 308 for the group 202 and be granted access to the group management system 306. The group management system 306 can have a user interface that an administrator 308 can use to view information about the group 202 and/or to make changes to the group 202. An administrator 308 can use the group management system 306 to make changes to the information in the group database 204, including adding new member UEs 206, deleting member UEs 206, changing permissions or priority levels associated with member UEs 206, changing identifiers 210 associated with member UEs 206, and/or any other types of changes. For example, when the group 202 represents employees of a small business, an owner of the small business who serves as an administrator 308 can use the group management system 306 to add a UE 102 associated with a newly hired employee as a member UE 206 of the group 202, or to remove a UE 102 associated with a fired employee from being a member UE 206 of the group 202.

In some examples, the group management system 306 can provide options by which an administrator 308 can set rules for the group 202. One type of rule can configure the communication server 200 to automatically change the status information 122 of some or all member UEs 206 of the group 202 in certain situations or on a preset schedule. For example, an administrator 308 of a group 202 associated with a business that is open Monday through Friday from 9 AM to 5 PM can set a rule that causes the communication server 200 to automatically change the status information 122 of some or all member UEs 206 to inactive when the business is scheduled to be closed, though the administrator 308 may also indicate in the rule that one or more specific member UEs 206 are to be set as active while the business is closed to serve as emergency contacts.

The group management system 306 can also allow the administrator 308 to manage the voicemail function 304 and/or access the message repository 302. For example, the administrator 308 can use the group management system 306 to set or record a voicemail greeting that is played to a caller when no member UEs 206 are active or a call 214 is not answered by an active member UE 206 within a predetermined time. The administrator 308 may also access or retrieve text messages 216 or other messages that have been stored in the message repository 302 via the group management system 306. In some examples, the administrator 308 can use the group management system 306 to configure the communication server 200 to automatically reply to incoming text messages 216 to the shared group number 208 with a preset response text message, in addition to forwarding those incoming text messages 216 to member UEs 206 and/or storing them in the message repository 302.

In some examples, an administrator 308 can be associated with a particular member UE 206 of the group 202. Accordingly, the group management system 306 can be configured to allow the administrator 308 can log in via that member UE 206, for instance through an application installed on the UE 102. In other examples, the group management system 306 can be accessible via a website or through an application available to any device that is not necessarily a member UE 206 of the group 202. For example, an administrator 308 associated with a member UE 206 of a group 202 may also be able to log in to the group management system 306 from a home computer or other device that is not a member UE 206 of the group 202.

A communication server 200 can have a member management system 310. Unlike the group management system 306, which can allow an administrator 308 to change information in the group database 204 about any member UE 206 of the group 202, the member management system 310 can be accessed by individual member UEs 206 of the group 202 to change at least some information in the group database 204 about the individual member UEs 206. For example, the member management system 310 can allow a user of a particular member UE 206 to change that member UE's status information 212 between being active and being inactive. For example, when a group 202 represents employees of a business and an employee is going on a lunch break, the employee can use the member management system 310 to change his or her member UE 206 from being active to inactive. Accordingly, the employee can avoid business calls 214 for the shared group number 208 during lunch, while such business calls 214 can ring at other member UEs 206 who remain as active during that time. In some examples, the member management system 310 can allow rules to be set for member UEs 206, such as rules that set their status information 212 as inactive for a period of time and automatically return their status information 212 to active after that period of time, or rules that automatically set their status information 212 to inactive based on a preset schedule.

In some examples, a member UE 206 can access the member management system 310 via an application that runs on, or is accessed by, the member UE 206. For example, as discussed above, the member UE 206 can have a communication application that interfaces with the communication server 200 to send and receive calls 214 and/or text messages 216, and the member UE 206 can access the member management system 310 via a user interface of that communication application. In other examples, a member UE 206 can access the member management system 310 through a website or any other interface.

Figure 4:
FIG. 4 depicts an example of a group database.

FIG. 4 depicts an example of a group database 204. In some examples, a group database 204 can include different and/or additional type of information relative to the types of information shown in FIGS. 2A and 2B. For example, a group database 204 can also include administrator information 402, communication type information 404, priority information 406, and/or any other types of information in addition to identifiers 210 and/or status information 212 about member UEs 206. As discussed above, the group database 204 can be stored at a communication server 200, or be stored at a server or other data location that is accessible to one or more communication servers 200.

In some examples, administrator information 402 can be flags or other values indicating whether member UEs 206 are associated with administrators 308 who have permission to access the group management system 306. In other examples, administrator information 402 can be information identifying administrator accounts that are not associated with specific members UE 206, such as an administrator account that can log in to the group management system 306 from any device.

Communication type information 404 can indicate the types of communications that individual members are set to receive from the communication server 200. For example, the communication type information 404 can be set to indicate that communication servers 200 should send both calls 214 and text messages 216 to a member UE 206, that a communication server 200 should send only calls 214 to a member UE 206, or that a communication server 200 should send only text messages 216 to a member UE 206.

In some examples, a communication server 200 can use the communication type information 404 to determine which member UEs 206 should receive a particular communication. For example, when a call 214 for the shared group number 208 is received at a communication server 200, the communication server 200 can consult the group database 204 to identify member UE 206 that are active and are also set to receive calls 214, and then send the call 214 to ring at those member UEs 206 while refraining from sending the call 214 to inactive member UEs 206 and to active member UEs 206 that are not set to receive calls 214. Similarly, even though text messages 216 sent to the shared group number 208 can otherwise be configured to be sent to both active and inactive member UEs 206 of a group 202, in some examples a communication server 200 can refrain from sending such text messages 216 to active and inactive member UEs 206 that are not set to receive text messages 216 in the communication type information 404 of the group database 204.

Communication type information 404 may also distinguish between different types of messages, and indicate whether specific member UEs 206 are set to receive text messages 216, voicemails, faxes, and/or other specific types of messages. For example, members UE 206 associated with one or more employees of a business who have been tasked with returning missed calls 214 from customers can be set to receive voicemails in the communication type information 404, whereas other member UEs 206 may be set to receive calls 214 but not voicemails. Accordingly, in this example an incoming call 214 can ring at multiple active member UEs 206, but if none of them answer the call 214 and the caller leaves a voicemail, the voicemail can be delivered to a smaller set of active UEs 206 instead of all active UEs 206. However, as discussed above, in other examples a group database 204 may not contain communication type information 404, and all active member UEs 206 can be set to receive calls 214 while all member UEs 206 can be set to receive messages even if they are inactive.

In some examples, the group database 204 can indicate priority information 406 for some or all of the member UEs 206. Priority information 406 can indicate that one or more member UEs 206 have been designated as being higher priority than other member UEs 206, such that a communication server 200 should attempt to send calls 214 or other communications to the higher priority member UEs 206 before sending them to lower priority member UEs 206. For example, the priority information 406 can identify member UEs 206 based on two or more priority level tiers, such as having a binary flag indicating whether member UEs 206 are or are not part of a priority subgroup, indicators that specific member UEs 206 have high, medium, or low priority levels, numbers indicating priority levels between 1 and 10 for individual member UEs 206, or any other type of priority information 406.

In some examples in which the group database 204 includes such priority information 406, a communication server 200 can initially send a call 214 to a first set of one or more member UEs 206 that have the highest priority level in the priority information 406. If no member UEs 206 of the first set answer the call 214 with a predetermined period of time, the communication server 200 can then send the call 214 to a second set of one or more member UEs 206 that have a lower priority level, and if necessarily continue this process for lower priority tiers of member UEs 206 until the call 214 is answered by a member UE 206 or the call has been sent to all of the active member UEs 206 in the group 202. If no active member UE 206 answers the call 214, the communication server 200 use a voicemail function 304 to answer the call and record a voicemail from the caller, as described above. The resulting voicemail can be delivered to any or all member UEs 206, such as all member UEs 206, all active member UEs 206, specific member UEs 206 designated as handling voicemails in the communication type information, and/or any other subset of the member UEs 206.

Example Architecture

Figure 5:
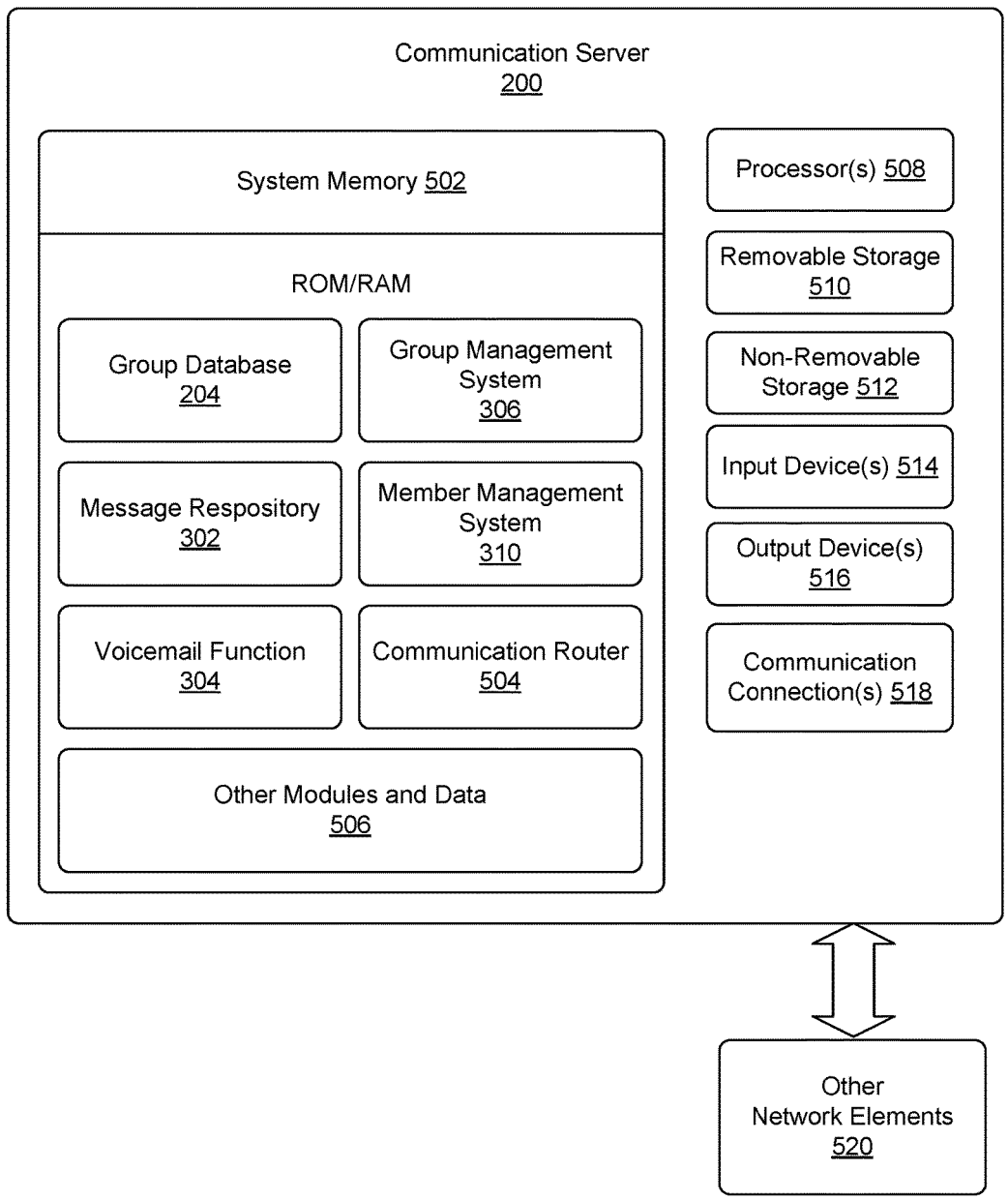
FIG. 5 depicts an example system architecture for a communication server.

FIG. 5 depicts an example system architecture for a communication server 200. In some examples, a single communication server 200 can store, access, and/or use the group database 204 to route calls 214 and/or text messages 216 sent to a shared group number 208. In other examples, separate communication servers 200 can process calls 214 and text messages 216, but can each access a common group database 204 associated with a group 202, or each have local synchronized copies of the same group database 204. Accordingly, although FIG. 5 depicts elements of the communication server 200 together in a single network component, in other examples any of the elements shown in FIG. 5 can be located at different network components and/or can be duplicated in separate communication server 200 for calls 214 and text messages 216.

A communication server 200 can have a system memory 502 that stores data for the communication server 200. In various examples, system memory 502 can be volatile (such as RAM), non-volatile (such as ROM, flash memory, etc.), or some combination of the two. Example system memory 502 can include one or more of RAM, ROM, EEPROM, a Flash Memory, a hard drive, a memory card, an optical storage, a magnetic cassette, a magnetic tape, a magnetic disk storage or another magnetic storage devices, or any other medium.

The system memory 502 can store data for the group database 204, the message repository 302, the voicemail function 304, the group management system 306, and/or the member management system 310 described above. The system memory 502 can also store data for a communication router 504 and/or other modules and data 506. The communication router 504 can receive calls 214 and/or text messages 216 sent to a shared group number 208, and can forward the calls 214 and/or text messages 216 to member UEs 206 of an associated group 202 as described herein. For example, the communication router 504 can receive a call 214 to a shared group number 208, look up active group member UEs 206 in an associated group database 204, and forward the call 214 to those active group member UEs 206, in some cases then initiating the voicemail function 304 if none of the active group member UEs 206 answer the call 214. The other modules and data 506 can be utilized by the communication server 200 to perform or enable performing any action taken by the communication server 200. The other modules and data 506 can include a platform and applications, and data utilized by the platform and applications.

The communication server 200 can also include processor(s) 508, removable storage 510, non-removable storage 512, input device(s) 514, output device(s) 516, and/or communication connections 518 for communicating with other network elements 520.

In some embodiments, the processor(s) 508 can be a central processing unit (CPU), a graphics processing unit (GPU), both CPU and GPU, or other processing unit or component known in the art.

The communication server 200 can also include additional data storage devices (removable and/or non-removable) such as, for example, magnetic disks, optical disks, or tape. Such additional storage is illustrated in FIG. 5 by removable storage 510 and non-removable storage 512. Computer storage media may include volatile and nonvolatile, removable and non-removable media implemented in any method or technology for storage of information, such as computer readable instructions, data structures, program modules, or other data. System memory 502, removable storage 510 and non-removable storage 512 are all examples of computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by the communication server 200. Any such computer-readable storage media can be part of the communication server 200. In various examples, any or all of system memory 502, removable storage 510, and non-removable storage 512, store programming instructions which, when executed, implement some or all of the herein-described operations of the communication server 200.

In some examples, the communication server 200 can also have input device(s) 514, such as a keyboard, a mouse, a touch-sensitive display, voice input device, etc., and/or output device(s) 516 such as a display, speakers, a printer, etc. These devices are well known in the art and need not be discussed at length here.

The communication server 200 can also contain communication connections 518 that allow the communication server 200 to communicate with other network elements 520, such as other elements of the IMS 110 and UE 102 that are member UEs 206 or a group 202. For example, a communication connection 518 can allow the communication server 200 to exchange SIP messages with UEs 102 through the IMS 110, the packet core 108, and base stations 106.

Example Operations

Figure 6:
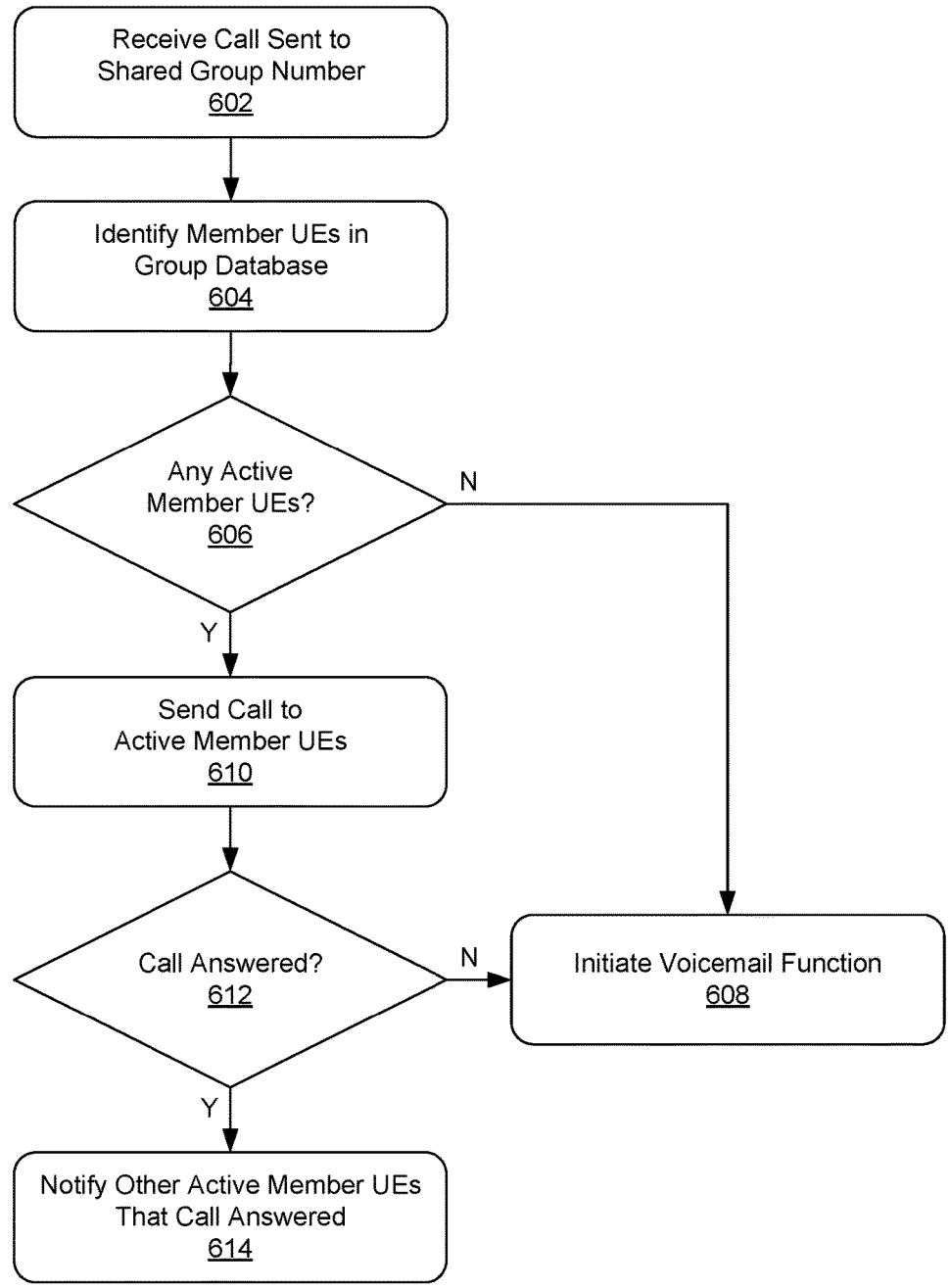
FIG. 6 depicts a flow chart of an example process for routing a call to a member UE of a group.

FIG. 6 depicts a flow chart of an example process for routing a call 214 to a member UE 206 of a group 202.

At operation 602, a communication server 200 can receive a call 214 for a shared group number 208 from a caller. As discussed above, the shared group number 208 can be associated with a group 202 of member UEs 206, with one or more of the member UEs 206 having their own distinct phone numbers that are different than the shared group number 208.

At operation 604, the communication server 200 can use a group database 204 to identify member UEs 206 that are part of the group 202 associated with the shared group number 208.

At operation 606, the communication server 200 can determine if any of the member UEs 206 in the group 202 are designated as being active in the group database's status information 212. If the group database 204 indicates that none of the member UEs 206 are active, the communication server 200 can use a voicemail function 304 at operation 608 to answer the call 214 and record a voicemail message from the caller if the caller chooses to leave a voicemail message. The voicemail message can then be stored in a message repository 302 and/or delivered to at least one of the member UEs 206 even if the member UEs 206 are designated as inactive in the group database 204.

However, if at operation 606 the communication server 200 determines that one or more member UEs 206 are designated as being active in the group database 204, the communication server 200 can forward the call 214 to the active member UEs 206 at operation 610. This can cause the call 214 to ring at one or more active member UEs 206. In some examples, the communication server 200 can forward the call 214 to all member UEs 206 identified as active in the group database 204. In other examples, the communication server 200 can forward the call 214 to a subset of active member UEs 206 based on priority information 406, such as one or more active member UEs 206 that are indicated as having the highest priority level in the priority information 406.

At operation 612, the communication server 200 can determine if the call 214 has been answered at one of the active member UEs 206. If the communication server 200 determines that one of the active member UEs 206 has answered the call 214, such as if the answering member UE 206 notifies the communication server 200 that it has answered the call 214, at operation 614 the communication server 200 can instruct other active member UEs 206, if any, that the call 214 has been answered. The other active member UEs 206 can accordingly cease ringing.

In some examples, if at operation 612 the communication server 200 determines that none of the active member UEs 206 answered the call 214, the communication server 200 can use a voicemail function 304 at operation 608 to answer the call 214 and record a voicemail message from the caller if the caller chooses to leave a voicemail message. The voicemail message can then be stored in a message repository 302 and/or delivered to at least one of the member UEs 206 even if the member UEs 206 are designated as inactive in the group database 204.

In other examples in which the communication server 200 sent the call 214 to a subset of active member UEs 206 based on priority information 406 during operation 610, and the communication server 200 determines at operation 612 that none of those active member UEs 206 answered the call 214, the communication server 200 can attempt to send the call 214 to one or more additional subsets of active member UEs 206 before using the voicemail function 304 to answer the call 214 at operation 608. For example, the communication server 200 can send the call to a high priority subset of active member UEs 206, then to a medium priority subset of active member UEs 206 if the call 214 was not answered by the high priority subset, then to a low priority subset of active member UEs 206 if the call 214 was not answered by the medium priority subset, and finally to the voicemail function 304 if the call 214 was not answered by the low priority subset.

Figure 7:
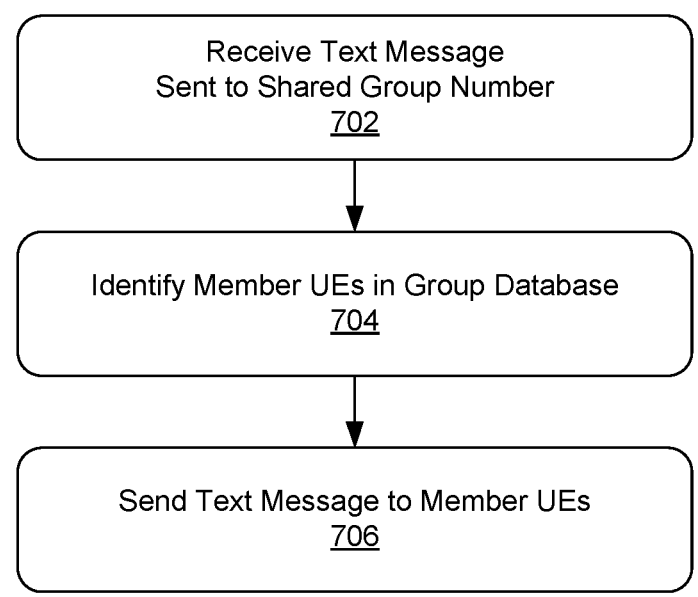
FIG. 7 depicts a flow chart of an example process for routing a text message to one or more member UEs of a group.

FIG. 7 depicts a flow chart of an example process for routing a text message 216 to one or more member UEs 206 of a group 202.

At operation 702, a communication server 200 can receive a text message 216 for a shared group number 208. Alternately, at operation 702 the communication server 200 can receive another type of message for the shared group number 208, such as a multimedia message, a voicemail message, a shared file, a fax, or any other type of message. Any such type of message can be routed using the operations of FIG. 7 described with respect to text messages 216. As discussed above, the shared group number 208 can be associated with a group 202 of member UEs 206, with one or more of the member UEs 206 having their own distinct phone numbers that are different than the shared group number 208.

At operation 704, the communication server 200 can use a group database 204 to identify member UEs 206 that are part of the group 202 associated with the shared group number 208.

At operation 706, the communication server 200 can forward the text message 216 on to the identified member UEs 206. Although the group database 204 may include status information 212 indicating whether individual member UEs 206 are active or inactive, the communication server 200 can be configured to send text messages 216 to some or all member UEs 206 regardless of whether they are active or not. However, in other examples the communication server 200 can send the text message 216 to a subset of the member UEs 206 based on status information 212, priority information 406, communication type information 404, and/or any other criteria.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a communication server, a call addressed to a shared group number associated with a group including a plurality of member user equipments (UEs);
   accessing, by the communication server, a group database containing information about the plurality of member UEs, each of the plurality of member UEs being associated with the shared group number and at least one of the plurality of member UEs being associated with a phone number different than the shared group number;
   identifying, by the communication server, one or more active member UEs from the plurality of member UEs based on status information in the group database, the status information identifying each of the plurality of member UEs as one of active or inactive;
   forwarding, by the communication server, the call to the one or more active member UEs;
   receiving, by the communication server, a text message addressed to a shared group number; and
   forwarding, by the communication server, the text message to at least one of the plurality of member UEs, without regard to the status information in the group database.

2. The method of claim 1, further comprising:
   receiving, by the communication server, an answer notification from a first member UE of the one or more active member UEs indicating that the first member UE has answered the call; and
   sending, by the communication server, a cease ringing instruction to the one or more active member UEs aside from the first member UE.

3. The method of claim 1, wherein the communication server receives the call as a Session Initiation Protocol (SIP) invitation message identifying the shared group number, and wherein the communication server forwards the SIP invitation message to the one or more active member UEs.

4. The method of claim 1, wherein the at least one of the plurality of member UEs to which the communication server forwards the text message is indicated as inactive in the status information in the group database and did not receive the call from the communication server.

5. The method of claim 1, wherein forwarding the text message to the at least one of the plurality of member UEs is based on a determination by the communication server that the group database indicates that the at least one of the plurality of member UEs is set to receive text messages.

6. The method of claim 1, wherein identifying the one or more active member UEs is further based on priority information in the group database, and the communication server forwards the call to at least a first subset of the one or more active member UEs based on the priority information.

7. The method of claim 1, further comprising modifying, by the communication server, the group database to change the status information from indicating that a particular member UE is active to indicating that the particular member UE is inactive.

8. The method of claim 7, wherein the communication server modifies the group database based on an instruction from the particular member UE or an administrator associated with the group, or based on a scheduling rule.

9. The method of claim 1, further comprising:
   answering, by the communication server, the call using a voicemail function if none of the one or more active member UEs answer the call;
   recording, by the communication server, a voicemail message using the voicemail function; and
   sending the voicemail message to at least one of the plurality of member UEs.

10. A communication server comprising:
    one or more processors; and
    memory storing computer-executable instructions that, when executed by the one or more processors, cause the communication server to perform operations comprising:
       receiving a call addressed to a shared group number associated with a group including a plurality of member user equipments (UEs);
       accessing a group database containing information about the plurality of member UEs, each of the plurality of member UEs being associated with the shared group number and at least one of the plurality of member UEs being associated with a phone number different than the shared group number,
       identifying one or more active member UEs from the plurality of member UEs based on status information in the group database, the status information identifying each of the plurality of member UEs as one of active or inactive;
       forwarding the call to the one or more active member UEs;
       receiving a text message addressed to a shared group number; and
       forwarding the text message to at least one of the plurality of member UEs without regard to the status information in the group database.

11. The communication server of claim 10, wherein the operations further comprise:
    receiving an answer notification from a first member UE of the one or more active member UEs indicating that the first member UE has answered the call; and
    sending a cease ringing instruction to the one or more active member UEs aside from the first member UE.

12. The communication server of claim 10, wherein identifying the one or more active member UEs is further based on priority information in the group database, and the call is forwarded to at least a first subset of the one or more active member UEs based on the priority information.

13. The communication server of claim 10, wherein the operations further comprise modifying the group database to change the status information from indicating that a particular member UE is active to indicating that the particular member UE is inactive.

14. One or more non-transitory computer-readable media storing computer-executable instructions that, when executed by one or more processors of a communication server, cause the one or more processors to perform operations comprising:
   receiving a call addressed to a shared group number associated with a group including a plurality of member user equipments (UEs);
   accessing a group database containing information about the plurality of member UEs, each of the plurality of member UEs being associated with the shared group number and at least one of the plurality of member UEs being associated with a phone number different than the shared group number;
   identifying one or more active member UEs from the plurality of member UEs based on status information in the group database, the status information identifying each of the plurality of member UEs as one of active or inactive;
   forwarding the call to the one or more active member UEs;
   receiving a text message addressed to a shared group number; and
   forwarding the text message to at least one of the plurality of member UEs without regard to the status information in the group database.

15. The one or more non-transitory computer-readable media of claim 14, wherein the operations further comprise:
   receiving an answer notification from a first member UE of the one or more active member UEs indicating that the first member UE has answered the call; and
   sending a cease ringing instruction to the one or more active member UEs aside from the first member UE.

16. The one or more non-transitory computer-readable media of claim 14, wherein identifying the one or more active member UEs is further based on priority information in the group database, and the call is forwarded to at least a first subset of the one or more active member UEs based on the priority information.

17. The one or more non-transitory computer-readable media of claim 14, wherein the operations further comprise modifying the group database to change the status information from indicating that a particular member UE is active to indicating that the particular member UE is inactive.

* * * * *